(12) United States Patent
Jacobs

(10) Patent No.: US 7,079,466 B1
(45) Date of Patent: Jul. 18, 2006

(54) METHOD AND DEVICE FOR RECORDING MARKS IN AN INFORMATION LAYER OF AN OPTICAL RECORD CARRIER

(75) Inventor: Bernardus A. J. Jacobs, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 457 days.

(21) Appl. No.: 09/537,078

(22) Filed: Mar. 28, 2000

(30) Foreign Application Priority Data

Mar. 30, 1999 (EP) .............................. 99200995.1

(51) Int. Cl.
*G11B 7/00* (2006.01)

(52) U.S. Cl. .................................... 369/59.12; 369/116

(58) Field of Classification Search ............... 369/116, 369/59.11, 59.12, 53.1, 53.13
See application file for complete search history.

(56) References Cited

U.S. PATENT DOCUMENTS

| | | | |
|---|---|---|---|
| 5,457,666 A | 10/1995 | Toda et al. | ................... 369/13 |
| 5,642,343 A * | 6/1997 | Toda et al. | ................... 369/116 |
| 5,745,467 A | 4/1998 | Sakaue et al. | ............... 369/116 |

FOREIGN PATENT DOCUMENTS

| | | |
|---|---|---|
| EP | 0797193 A1 | 9/1997 |
| EP | 0978827 A2 | 9/2000 |
| WO | WO9730440 | 8/1997 |
| WO | WO9836411 | 8/1998 |

* cited by examiner

*Primary Examiner*—Thang V. Tran
(74) *Attorney, Agent, or Firm*—Michael E. Belk

(57) ABSTRACT

An optical carrier is written with a mark representing recorded data, by a sequence of radiation pulses. Additional power levels are introduced in between the cooling power level and the erase power level during the cooling period. This results in a reduced jitter of the written marks.

27 Claims, 4 Drawing Sheets

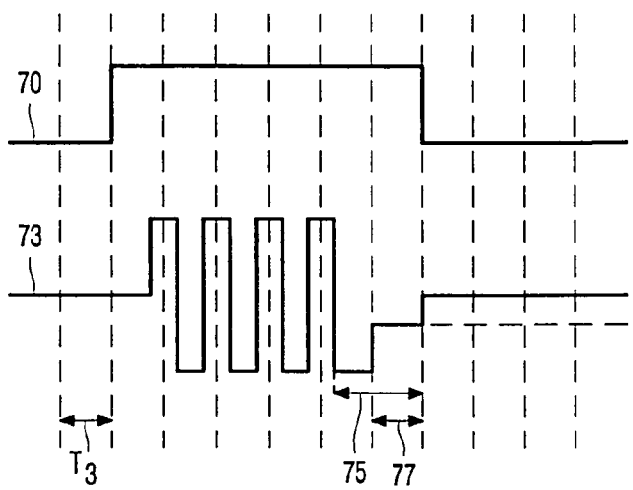
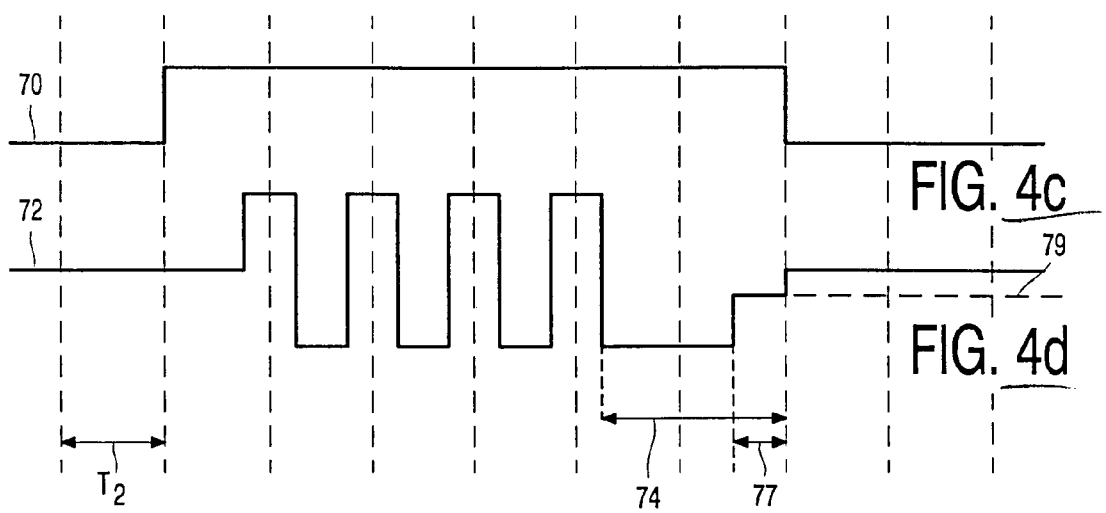

US 7,079,466 B1

METHOD AND DEVICE FOR RECORDING MARKS IN AN INFORMATION LAYER OF AN OPTICAL RECORD CARRIER

FIELD OF THE INVENTION

The invention relates to a method of recording marks representing data in an information layer of a record carrier by irradiating the information layer by means of a pulsed radiation beam, each mark being written by a sequence of pulses.

The invention also relates to an optical recording device for recording data in the form of marks on an information layer of a record carrier by irradiating the information layer by means of a radiation beam, the device comprising a radiation source providing the radiation beam and a control unit for controlling the power of the radiation beam.

BACKGROUND OF THE INVENTION

A recording method and device as defined in the preamble are known from international patent application WO 97/30440 (publication date 21 Aug. 1997). A mark is written by a sequence of write pulses and the previously written marks between the marks being written are erased by applying an erase power level in between the sequences. The known sequence has a first power level, or bias level, between the pulses and a return to the first power level after the last pulse of the sequence before rising to an erase power level.

International patent application WO 98/36411 (publication date 20 Aug. 1998) discloses an improved method which has the feature that the sequence of write pulses has a first power level, or bias level, between the pulses and a second power level, or cooling level, after the last pulse of the sequence before rising to the erase power level, the second power level being in a range between the first power level and the erase power level.

A change of the first, or bias, power level in the known methods affects both the leading-edge jitter and the trailing-edge jitter. The jitter is the standard deviation of the time differences between level transitions in the digitized read signal and the corresponding transitions in a clock signal, the time differences being normalized by the duration of one period of said clock. The method described in WO 98/36411 introduces an additional degree of freedom by making the power level during the cooling period, i.e. the period following the last pulse in a sequence and preceding the rising to the erase power level, independent of the bias power level, thus allowing the trailing-edge jitter to be influenced almost independently of the leading-edge jitter.

The known methods are suitable for direct-overwrite on a record carrier, i.e. by writing information to be recorded in the information layer of the record carrier and at the same time erasing information previously written in the information layer. The methods can be used for example, in direct-overwriting on an information layer made of a phase-change material.

SUMMARY OF THE INVENTION

It is a disadvantage of the known methods that they do not allow a sufficient reduction of the jitter in the read signal obtained from reading marks written by using the known methods, especially when the marks are written at high recording speeds.

It is an object of the invention to provide a method of recording marks of the kind described in the opening paragraph, having a reduced jitter.

This object is achieved when the method defined in the preamble is characterized in that the radiation beam has a first power level between the pulses, a second power level after the last pulse of the sequence, followed by at least one intermediate power level and, subsequently, by a third power level and in that the intermediate power level is higher than the second power level and lower than the third power level.

The method according to the invention introduces at least one additional power level during the cooling period after the second, or cooling, power level and before the third, or erase, power level. This additional, or intermediate, power level, being in a range between the cooling power level and the erase power level, results in the jitter of the marks being smaller than the jitter of the marks recorded by means of the known methods.

A preferred embodiment of the method according to the invention is characterized in that there are at least two intermediate power levels, and in that the (N+1)th intermediate power level is higher than or equal to its directly preceding Nth intermediate power level.

In this embodiment, a gradual transition from the cooling power level to the erase power level is obtained by introducing a sequence of increasing intermediate power levels, resulting in especially the trailing-edge jitter being smaller than the trailing-edge jitter of the marks recorded by means of the known methods.

An embodiment of the method according to the invention is characterized in that at least one intermediate power level is a function of time, and that the intermediate power level is continuously increasing.

An even more gradual transition from the cooling power level to the erase power level is obtained by applying an intermediate power level which continuously increases as a function of time. This function might be a function with a linear relation between power level and time, but also other functions such as, for example, parabolic functions can be applied.

An embodiment of the method according to the invention is characterized in that the second power level is equal to the first power level.

When the second, or cooling, power level is equal to the first, or bias, power level, a good cooling of the information layer of the record carrier after irradiating the information layer by a sequence of pulses is obtained. When the cooling power level is in the range between the bias power level and the erase power level, i.e. the cooling power level is higher than the bias power level, the cooling will be less than optimal and, because of this, the marks recorded in this way will have an enlarged area and an enlarged jitter compared to the marks recorded with a cooling power level which is equal to the bias power level.

An embodiment of the method according to the invention is characterized in that there is only one intermediate power level having a constant value, and that the value of the intermediate power level is within a range from 0.3 to 0.6 times the value of the third power level.

When the intermediate power level is within a range from 0.3 to 0.6 times the third, or erase, power level, both the leading-edge jitter and the trailing-edge jitter are found to be minimal when applying one intermediate power level.

A further embodiment of the method according to the invention is characterized in that there are only two intermediate power levels, the first intermediate power level having a first constant value and the second intermediate power level having a second constant value, and that the first constant value is within a range from 0.3 to 0.5 times the value of the third power level and the second constant value is within a range from 0.6 to 0.9 times the value of the third power level.

By applying two intermediate power levels, a further reduction of particularly the trailing-edge jitter is obtained, especially when the first intermediate power level is in the range from 0.3 to 0.5 times the third, or erase, power level and the second intermediate power level is in the range from 0.6 to 0.9 times the erase power level.

An embodiment of the method according to the invention is characterized in that the intermediate power level is maintained during a fixed period, the duration of which is independent of the writing speed.

By maintaining a fixed duration of the intermediate power level, which duration is independent of the writing speed, a further reduction of the jitter is obtained when recording marks at variable writing speeds. Variable writing speeds arise, for example, when recording marks on a disc-shaped record carrier rotating at a constant angular velocity (CAV).

It is known from WO 98/36411 that the cooling period is preferably made dependent on the writing speed. If the cooling period is too short, the erasure starts too soon and will erase too much of the mark just written. If the cooling period is too long the erasure starts too late and previously written marks immediately following the mark just written will not be erased. There is an optimum duration of the cooling period when writing at a certain speed. In this embodiment of the method according to the invention, the duration of the intermediate power level is fixed and is therefore independent of the writing speed, while the duration of the cooling period can be made dependent on the writing speed by adapting the duration of the cooling power level. By applying a fixed duration of the intermediate power level while optimizing the duration of the cooling period, a reduction of the jitter is obtained while maintaining a correct erasure.

A further embodiment of the method according to the invention is characterized in that the intermediate power level is maintained during a fixed period, the duration of which is dependent on properties of the record carrier.

The optimal duration of the intermediate power level, which duration is independent of the writing speed, is dependent on properties of the record carrier. An optimal duration should be determined for each record carrier.

An embodiment of the method according to the invention is characterized in that, for recording a mark with a period of N channel bits, the number of pulses in the sequence of pulses equals N−2.

A mark in the data signal with a period of N channel bits, where the period of one channel bit corresponds to one period of the data clock of the data signal, is generally recorded by applying a sequence of (N−1) pulses. The method according to the invention introduces an asymmetry in the retrieved signal because of the additional intermediate level at the end of the cooling period. This asymmetry can be reduced by recording a mark in the data signal with a period of N channel bits by applying a sequence of (N−2) pulses. The data signal may be a so-called EFM or EFM-plus coded signal, which signal contains marks with a length ranging from 3 channel bit periods to 11 channel bit periods.

It is a further object of the invention to provide an optical recording device of the kind described in the opening paragraph, adapted for use of the method according to the invention.

This object is achieved when the optical recording device defined in the preamble is characterized in that the control unit is operative for providing a sequence of pulses for writing a mark and controlling the power of the radiation beam in such a way that the radiation beam has a first power level between the pulses, a second power level after the last pulse of the sequence, followed by at least one intermediate power level and subsequently, by a third power level and in that the intermediate power level is higher than the second power level and lower than the third power level.

BRIEF DESCRIPTION OF THE DRAWING

The objects, features and advantages of the invention will be apparent from the following, more particular description of embodiments of the invention, as illustrated in the accompanying drawings, where FIGS. 4a–4c shows diagrams comprising the time dependence of the data signal and the control signal controlling the power levels of the radiation beam, at various writing speeds.

DETAILED DESCRIPTION OF THE INVENTION

Figures 1A, 1B, 1C:
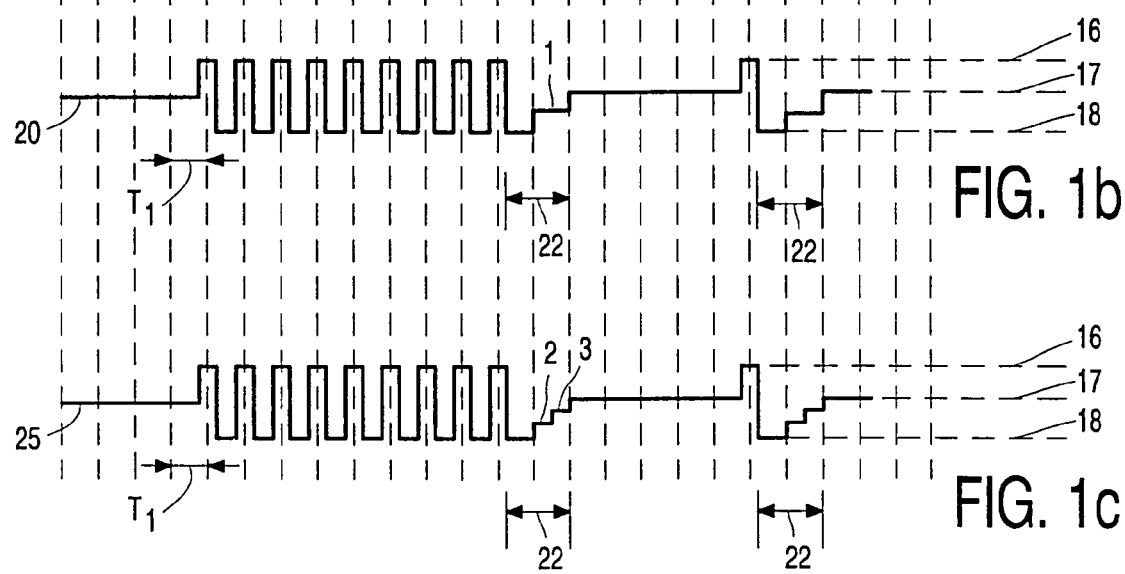
FIGS. 1a–1c shows diagrams comprising the time dependence of the data signal and of the control signal controlling the power levels of the radiation beam.

FIG. 1 shows diagrams comprising two signals, a digital data signal 10 and control signal 20 and 25, as used in the method according to the invention. FIG. 1a gives the value of the digital data signal 10 as a function of time, the value of the signal representing information to be recorded. The vertical dashed lines indicate transitions in a clock signal of a data clock belonging to the data signal. The period of the data clock, also called the channel bit period, is indicated by $T_1$. When recording this data signal, a 'high' period 11 is recorded as a mark having a length corresponding to the duration of the 'high' period, and a 'low' period 12 is recorded as an unwritten area, a space, between the marks and having a length corresponding to the duration of the 'low' period. In general, the length of a mark is substantially equal to the number of channel bit periods of the data signal times the writing speed. The length of a mark is therefore often expressed by the number of data clock periods when the corresponding data signal is 'high' (e.g., 11T for a mark with a corresponding data signal being 'high' for 11 data clock periods).

The data is written in an optical record carrier having an information layer. The marks representing the data are written along a track in the information layer by a radiation beam. The marks are areas of the information layer having optical characteristics which are different from their surroundings, which makes optical reading of marks possible.

FIG. 1b shows a control signal 20 corresponding to the data signal 10 in a first embodiment of the invention and FIG. 1c shows a control signal 25 corresponding to the data signal 10 in a second embodiment of the invention. The control signal 20 or 25 is used for modulating the power of a radiation beam with which the marks are being written on the information layer, where it is assumed that the power level of the radiation beam is proportional to the level of the control signal.

FIGS. 1b and 1c each show two sequences of write pulses for writing two marks. A 'high' period of N channel bits in the data signal 10, also called NT mark, is recorded in the embodiments of the recording method shown in FIG. 1 using N−2 write pulses (e.g. the 11T mark is recorded using 9 write pulses). However, it is also possible to use a different number of write pulses, such as N−1 or N, for recording an NT mark.

The power in between the pulses, the pulses having a write power level 16, is at a first power level, also called bias power level 18. In a cooling period 22 after the last pulse of the sequence and before rising to a third power level, also called erase power level 17, the power level is first at a second power level, also called cooling power level. In the embodiments of the invention shown in FIG. 1, the second power level is equal to the bias power level 18. However, the second power level may also have any chosen power level in between the bias power level 18 and the erase power level 17.

In the embodiment of the invention shown in FIG. 1b, there is one intermediate power level 1 at the end of the cooling period 22, just after the cooling power level and just before rising the erase power level 17.

FIG. 1c shows an embodiment of the invention where there are two intermediate power levels 2 and 3, where the first intermediate power level 2 is lower than the second intermediate power level 3. The introduction of the intermediate power levels results in a gradual transition from the cooling power level to the erase power level. It may be apparent to those skilled in the art that introducing more intermediate levels results in an even more gradual transition.

Figure 2:
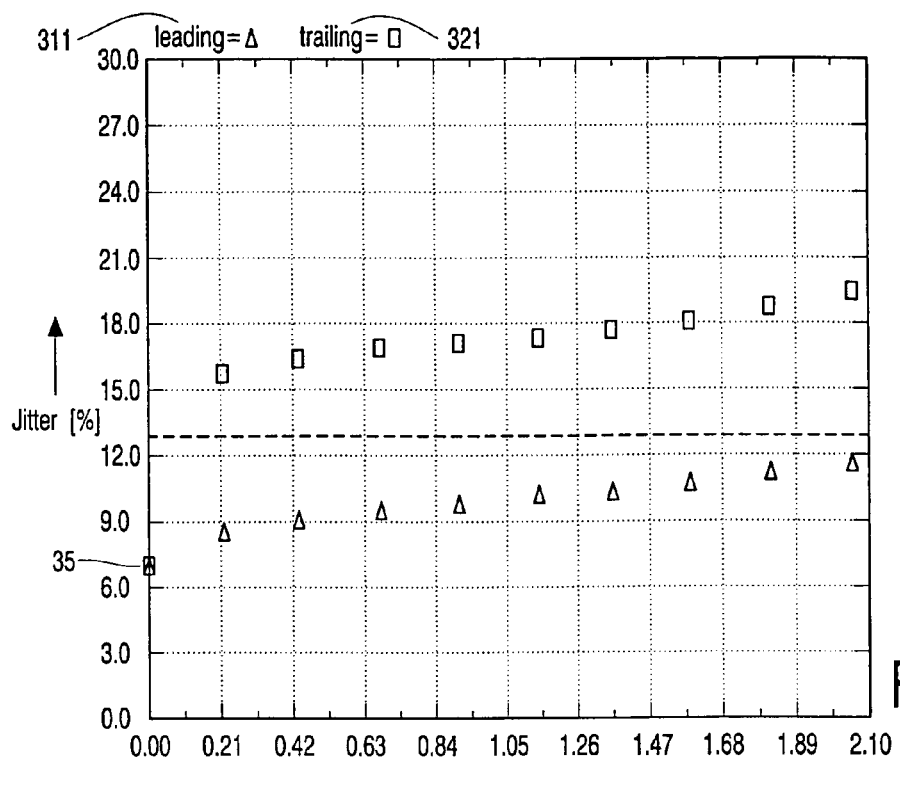
FIG. 2 shows the result of a measurement of the jitter as a function of the cooling power level.

FIG. 2 shows the result of a measurement of the leading-edge jitter 311 and of the trailing-edge jitter 321 as a function of the cooling power level $P_C$, the bias power level being at a value of 0 mW. It is clear from this Figure that both the leading-edge jitter 311 and the trailing-edge jitter 321 are at a minimal value 35 when the cooling power level $P_C$ is equal to the bias power level (i.e. 0 mW). Especially the trailing-edge jitter increases significantly when the value of the cooling power level $P_C$ increases above the bias power level.

Figure 3:
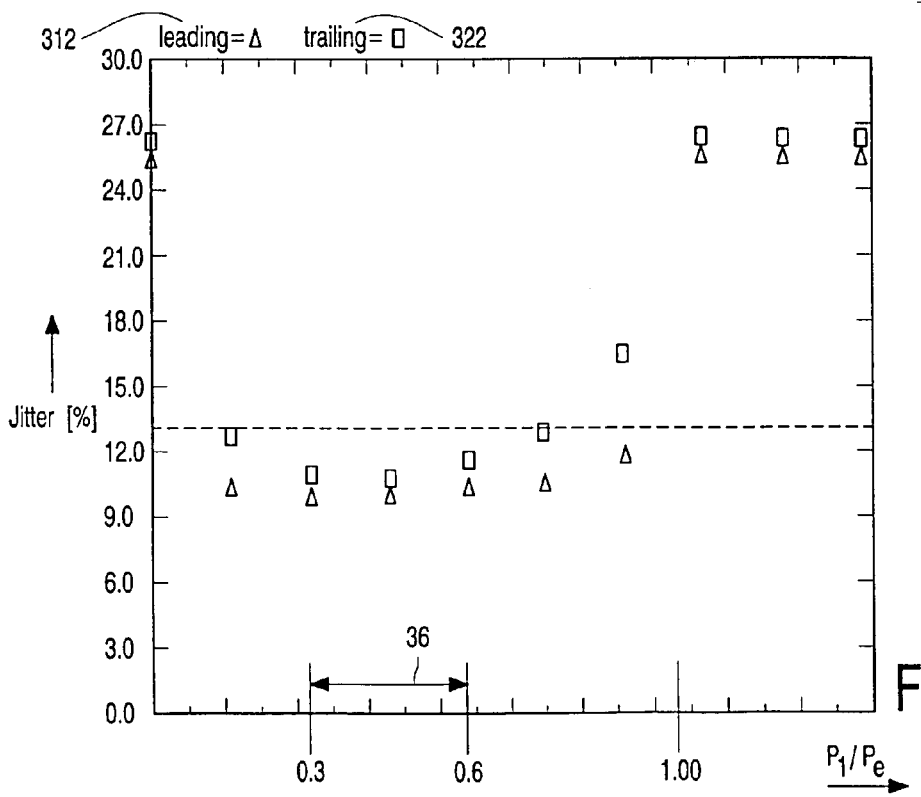
FIG. 3 shows the result of a measurement of the jitter as a function of the intermediate power level.

FIG. 3 shows the result of a measurement of the leading-edge jitter 312 and of the trailing-edge jitter 322 as a function of the intermediate power level 1 in FIG. 1b. The value of the intermediate power level 1 is normalized by the value of the erase power level 17. The normalized intermediate power level is represented by $P_1/P_e$. During this measurement, the cooling power level is equal to the bias power level. It is clear from FIG. 3 that both the leading-edge jitter 312 and the trailing-edge jitter 322 are minimal when $P_1/P_e$ is in a range 36 between 0.3 and 0.6.

When writing data on a record carrier, the writing speed may vary. A variable writing speed is encountered, for example, encountered when writing on a disc-shaped record carrier rotating at a constant angular velocity (CAV). Here, the writing speed increases when going from writing an area at the inner radius of the record carrier to writing an area at the outer radius of the record carrier.

An embodiment of the recording method dealing with a variable writing speed will now be explained with reference to FIG. 4. FIG. 4a shows a data signal 70 comprising a 'high' period of six channel bit periods, i.e. a 6T mark, to be recorded near the outer radius of a record carrier, while FIG. 4c shows a similar data signal 70 comprising a 'high' period of six channel bit periods to be recorded near the inner radius of a record carrier. FIGS. 4a, 4b, 4c and 4d are drawn at the same scale. The frequency of the data clock at the inner radius is about a factor of two lower than at the outer radius. Hence, the channel bit period $T_2$ at the inner radius is about twice as long as the channel bit period $T_3$ at the outer radius.

The control signal 73 used to record the data signal 70 at the outer radius of the record carrier, i.e. at a higher writing speed, is shown in FIG. 4b, while the control signal 72 used to record the data signal 70 at the inner radius of the record carrier is shown in FIG. 4d. In this example, one intermediate power level and a sequence of pulses with each pulse having a duty cycle of 50% is shown. However, more than one intermediate power level and pulses with a duty cycle other than 50% may also be used.

The cooling period at the inner radius 74 is about twice as long as the cooling period at the outer radius 75. Therefore, in this example, the cooling period is dependent on the writing speed. However, the period 77, when the intermediate power level 79 is applied is identical when writing a mark at the outer radius compared to when writing a mark at the inner radius. Consequently, the period 77 when the intermediate power level 79 is applied is independent of the writing speed.

Figure 5:
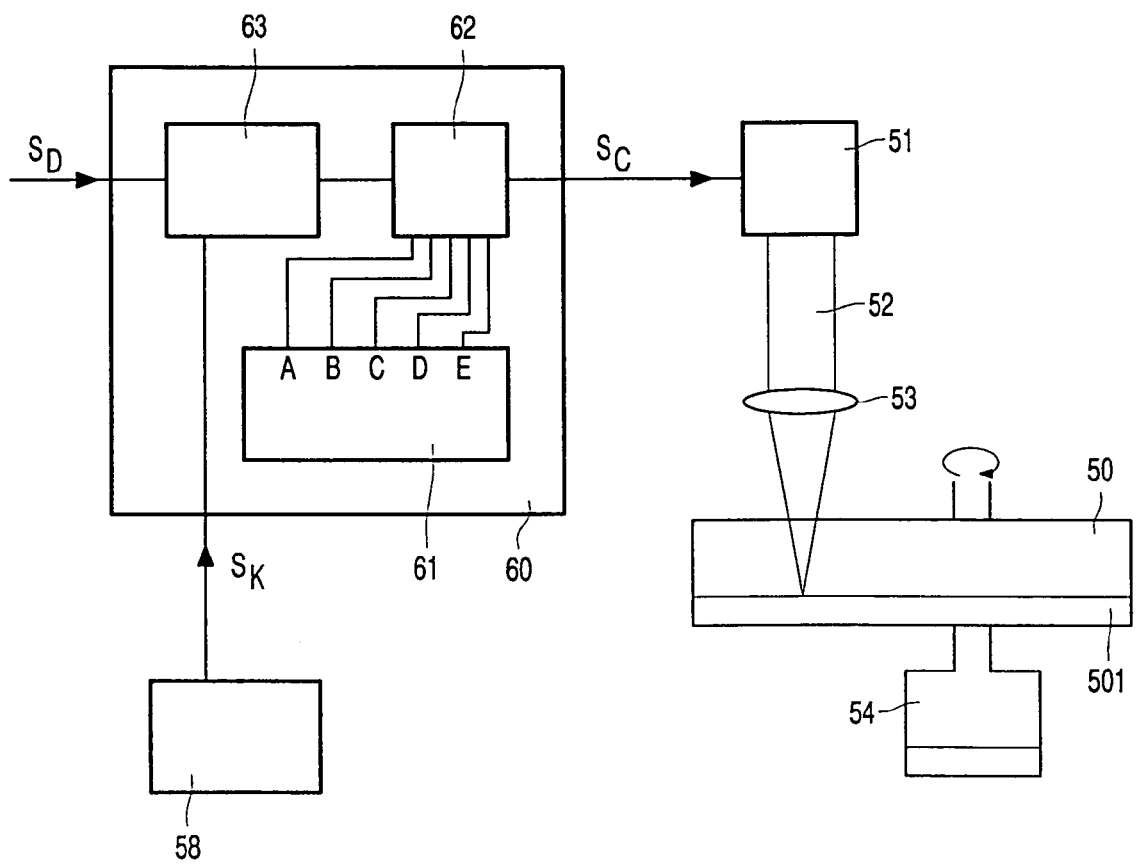
FIG. 5 shows a diagram of a recording device according to the invention.

FIG. 5 shows a recording device according to the invention for recording on a disc-shaped optical record carrier 50. Alternatively, the record carrier may be in the form of a tape. A data signal $S_D$ comprising the information to be recorded is connected to a control unit 60. A current source 61 within the control unit 60 has five outputs, A, B, C, D and E. Output A provides a current which, when fed into a radiation source 51, through a control signal $S_C$, will result in a radiation beam 52 having a write power level. Likewise, outputs B, C, D and E provide currents resulting in the first, or bias, power level, the second, or cooling, power level, the intermediate power level and the third, or erase, power level, respectively. The current of each output A, B, C, D, and E can be selected by a switch unit 62. The switch unit 62 is operated by a pattern generator 63 controlled by the data signal $S_D$ and a clock signal $S_K$. The pattern generator 63 transforms the data signal $S_D$ into sequences of write pulses, cooling power level, erase power level and intermediate power levels in accordance with a desired pattern. The clock signal $S_K$ is obtained from a clock generator 58. When the recording device is used for writing at a single speed, the clock generator 58 is preset at a fixed frequency. When writing at a variable speed, the frequency of the clock generator 58 will vary with the actual writing speed.

The control signal $S_C$ provided at the output of the control unit 60 and carrying the sequences of write pulses is connected to the radiation source 51. The control signal $S_C$ controls the power of the radiation beam 52 generated by the radiation source 51. The radiation beam 52 is focused by a lens 53 onto an information layer 501 of the record carrier 50. The disc-shaped record carrier 50 is rotated around its center by a motor 54.

This embodiment of a recording device according to the invention is suitable for executing the embodiment of the method according to the invention as shown in FIG. 1b, using only one intermediate power level 1. However, it may be apparent to those skilled in the art that embodiments of a recording device according to the invention using more than one intermediate power level can be realized by adding additional outputs to the current source 61 and by extending the switch unit 62.

The invention claimed is:

1. A method of recording marks representing data in an information layer of a record carrier by irradiating the information layer by means of a pulsed radiation beam, comprising:
    writing a series of marks, each mark being written by a sequence of irradiation pulses at a write power and with irradiation at a first power level between the pulses; and
    between writing subsequent marks, irradiating with a series of power levels including: a second power level after the last pulse of the sequence, followed by at least one intermediate power level, followed by a third power level that is different than the write power level, and the intermediate power level is higher than the second power level and lower than the third power level.

2. The method of claim 1, in which:
    the second power level is equal to the first power level;
    the one or more intermediate power levels being sleeted from one of: there is only one intermediate power level, the intermediate power level having a constant value within a range from 0.3 to 0.6 times the value of the third power level; and there are only two intermediate power levels, the first intermediate power level having a first constant value and the second intermediate power level having a second constant value, and that the first constant value is within a range from 0.3 to 0.5 times the value of the third power level and the second constant value is within a range from 0.6 to 0.9 times the value of the third power level; and at least one intermediate power level is a function of time, and that the intermediate power level is continuously increasing; and there are at least two intermediate power levels, and the (N+1)th intermediate power level is higher than or equal to its directly preceding Nth intermediate power level;
    the data is recorded at variable writing speeds; the second power level is maintained for a period that is dependent on the writing speed; and the intermediate power level is maintained during a fixed period, the duration of which is independent of the writing speed;
    the intermediate power level is maintained during a fixed period, the duration of which is dependent on properties of the record carrier;
    the third power level is lower than the write power level;
    the third power level is an erase level capable of erasing previously written marks to produce an unmarked region separating the marks;
    a mark is recorded with a period of N channel bits in the data signal; and
    for recording a mark with a period of N channel bits, the number of pulses in the sequence of pulses equals N−2.

3. A method of recording marks representing data in an information layer of a record carrier by irradiating the information layer by means of a pulsed radiation beam, each mark being written by a sequence of pulses, in which the radiation beam has a first power level between the pulses, a second power level after the last pulse of the sequence, followed by at least one intermediate power level and, subsequently, by a third power level and in that the intermediate power level is higher than the second power level and lower than the third power level, and in which there are at least two intermediate power levels, and in that the (N+1)th intermediate power level is higher than or equal to its directly preceding Nth intermediate power level.

4. An optical recording device for recording data in the form of marks on an information layer of a record carrier by irradiating the information layer by means of a radiation beam, the device comprising:
    a radiation source providing the radiation beam; and
    control means for controlling the power of the radiation beam and for providing a sequence of pulses for writing a mark and controlling the power of the radiation beam in such a way that the radiation beam has a first power level between the pulses, a second power level after the last pulse of the sequence, followed by at least one intermediate power level and subsequently, by a third power level and in that the intermediate power level is higher than the second power level and lower than the third power level, and in which there are at least two intermediate power levels, and the (N+1)th intermediate power level is higher than or equal to its directly preceding Nth intermediate power level.

5. A method of recording marks representing data in an information layer of a record carrier by irradiating the information layer by means of a pulsed radiation beam, each mark being written by a sequence of pulses, in which the radiation beam has a first power level between the pulses, a second power level after the last pulse of the sequence, followed by at least one intermediate power level and, subsequently, by a third power level and in that the intermediate power level is higher than the second power level and lower than the third power level, and in which at least one intermediate power level is a function of time, and that the intermediate power level is continuously increasing.

6. A method of recording marks representing data in an information layer of a record carrier by irradiating the information layer by means of a pulsed radiation beam, each mark being written by a sequence of pulses, in which the radiation beam has a first power level between the pulses, a second power level after the last pulse of the sequence, followed by at least one intermediate power level and, subsequently, by a third power level and in that the intermediate power level is higher than the second power level and lower than the third power level, and in which the second power level is equal to the first power level.

7. A method of recording marks representing data in an information layer of a record carrier by irradiating the information layer by means of a pulsed radiation beam, each mark being written by a sequence of pulses, in which the radiation beam has a first power level between the pulses, a second power level after the last pulse of the sequence, followed by at least one intermediate power level and, subsequently, by a third power level and in that the intermediate power level is higher than the second power level and lower than the third power level, and in which there is only one intermediate power level, the intermediate power level having a constant value within a range from 0.3 to 0.6 times the value of the third power level.

8. A method of recording marks representing data in an information layer of a record carrier by irradiating the information layer by means of a pulsed radiation beam, each mark being written by a sequence of pulses, in which the radiation beam has a first power level between the pulses, a second power level after the last pulse of the sequence, followed by at least one intermediate power level and, subsequently, by a third power level and in that the intermediate power level is higher than the second power level and lower than the third power level, and in which there are only two intermediate power levels, the first intermediate power level having a first constant value and the second intermediate power level having a second constant value, and that the first constant value is within a range from 0.3 to 0.5 times the value of the third power level and the second constant value is within a range from 0.6 to 0.9 times the value of the third power level.

9. A method of recording marks representing data in an information layer of a record carrier by irradiating the information layer by means of a pulsed radiation beam, each mark being written by a sequence of pulses, in which the radiation beam has a first power level between the pulses, a second power level after the last pulse of the sequence, followed by at least one intermediate power level and, subsequently, by a third power level and in that the intermediate power level is higher than the second power level and lower than the third power level, and in which:

data is recorded at variable writing speeds;

the second power level is maintained for a period that depends on the writing speed; and the intermediate power level is maintained during a fixed period that is independent of the writing speed.

10. A method of recording marks representing data in an information layer of a record carrier by irradiating the information layer by means of a pulsed radiation beam, each mark being written by a sequence of pulses, in which the radiation beam has a first power level between the pulses, a second power level after the last pulse of the sequence, followed by at least one intermediate power level and, subsequently, by a third power level and in that the intermediate power level is higher than the second power level and lower than the third power level, and in which the intermediate power level is maintained during a fixed period, the duration for which is dependent on properties of the record carrier and independent of the writing speed.

11. A method of recording marks representing data in an information layer of a record carrier by irradiating the information layer by means of a pulsed radiation beam, each mark being written by a sequence of pulses, in which the radiation beam has a first power level between the pulses, a second power level after the last pulse of the sequence, followed by at least one intermediate power level and, subsequently, by a third power level and in that the intermediate power level is higher than the second power level and lower than the third power level, and in which:

a mark is recorded with a period of N channel bits in the data signal; and for recording a mark with a period of N channel bits, the number of pulses in the sequence of pulses equals N−2.

12. An optical recording device for recording data in the form of marks on an information layer of a record carrier by irradiating the information layer by means of a radiation beam, the device comprising:

a radiation source providing the radiation beam; and control means for controlling the power of the radiation beam and for providing a sequence of pulses for writing a mark and controlling the power of the radiation beam in such a way that the radiation beam has a first power level between the pulses, a second power level after the last pulse of the sequence, followed by at least one intermediate power level and subsequently, by a third power level and in that the intermediate power level is higher than the second power level and lower than the third power level, and in which: at least one intermediate power level is a function of time, and the intermediate power level is continuously increasing.

13. An optical recording device for recording data in the form of marks on an information layer of a record carrier by irradiating the information layer by means of a radiation beam, the device comprising:

a radiation source providing the radiation beam; and control means for controlling the power of the radiation beam and for providing a sequence of pulses for writing a mark and controlling the power of the radiation beam in such a way that the radiation beam has a first power level between the pulses, a second power level after the last pulse of the sequence, followed by at least one intermediate power level and subsequently, by a third power level and in that the intermediate power level is higher than the second power level and lower than the third power level, and in which the second power level is equal to the first power level.

14. An optical recording device for recording data in the form of marks on an information layer of a record carrier by irradiating the information layer by means of a radiation beam, the device comprising:

a radiation source providing the radiation beam; and control means for controlling the power of the radiation beam and for providing a sequence of pulses for writing a mark and controlling the power of the radiation beam in such a way that the radiation beam has a first power level between the pulses, a second power level after the last pulse of the sequence, followed by at least one intermediate power level and subsequently, by a third power level and in that the intermediate power level is higher than the second power level and lower than the third power level, and in which there only is one intermediate power level, the intermediate power level having a constant value within a range from 0.3 to 0.6 times the value of the third power level.

15. An optical recording device for recording data in the form of marks on an information layer of a record carrier by irradiating the information layer by means of a radiation beam, the device comprising:

a radiation source providing the radiation beam; and control means for controlling the power of the radiation beam and for providing a sequence of pulses for writing a mark and controlling the power of the radiation beam in such a way that the radiation beam has a first power level between the pulses, a second power level after the last pulse of the sequence, followed by at least one intermediate power level and subsequently, by a third power level and in that the intermediate power level is higher than the second power level and lower than the third power level, and in which there are only two intermediate power levels, the first intermediate power level having a first constant value and the second intermediate power level having a second constant value, and the first constant value is within a range from 0.3 to 0.5 times the value of the third power level and that the second constant value is within a range from 0.6 to 0.9 times the value of the third power level.

16. An optical recording device for recording data in the form of marks on an information layer of a record carrier by irradiating the information layer by means of a radiation beam, the device comprising:

a radiation source providing the radiation beam; and control means for controlling the power of the radiation beam and for providing a sequence of pulses for writing a mark and controlling the power of the radiation beam in such a way that the radiation beam has a first power level between the pulses, a second power level after the last pulse of the sequence, followed by at least one intermediate power level and subsequently, by a third power level and in that the intermediate power level is higher than the second power level and lower than the third power level, and in which: the data is recorded at variable writing speeds; the second power level is maintained for a period that is dependent on the writing speed; and the intermediate power level is maintained during a fixed period that is independent of the writing speed.

17. An optical recording device for recording data in the form of marks on an information layer of a record carrier by irradiating the information layer by means of a radiation beam, the device comprising:

a radiation source providing the radiation beam; and control means for controlling the power of the radiation beam and for providing a sequence of pulses for writing a mark and controlling the power of the radiation beam in such a way that the radiation beam has a first power level between the pulses, a second power level after the last pulse of the sequence, followed by at least one intermediate power level and subsequently, by a third power level and in that the intermediate power level is higher than the second power level and lower than the third power level, and in which the intermediate power level is maintained during a fixed period, the duration of which is dependent on properties of the record carrier and independent of the writing speed.

18. An optical recording device for recording data in the form of marks on an information layer of a record carrier by irradiating the information layer by means of a radiation beam, the device comprising:

a radiation source providing the radiation beam; and control means for controlling the power of the radiation beam for writing a series of marks, the writing of sequential marks including: a sequence of pulses having a write power for writing a mark, and a first power level between the pulses, and between writing subsequent marks irradiating with a series of power levels including: a second power level after the last pulse of the sequence, followed by at least one intermediate power level followed by a third power level that is different than the write power level, and the intermediate power level is higher than the second power level and lower than the third power level.

19. The device of claim 18, in which:

the second power level is equal to the first power level;

the one or more intermediate power levels being selected from one of: there is only one intermediate power level, the intermediate power level having a constant value within a range from 0.3 to 0.6 times the value of the third power level; and there are only two intermediate power levels, the first intermediate power level having a first constant value and the second intermediate power level having a second constant value, and that the first constant value is within a range from 0.3 to 0.5 times the value of the third power level and the second constant value is within a range from 0.6 to 0.9 times the value of the third power level; and at least one intermediate power level is a function of time, and that the intermediate power level is continuously increasing; and there are at least two intermediate power levels, and the (N+1)th intermediate power level is higher than or equal to its directly preceding Nth intermediate power level;

the third power level is lower than the write power level;

the third power level is an erase level capable of erasing previously written marks to produce an unmarked region separating the marks;

the data is recorded at variable writing speeds; the second power level is maintained for a period that is dependent on the writing speed; and the intermediate power level is maintained during a fixed period, the duration of which is independent of the writing speed; and the intermediate power level is maintained during a fixed period, the duration of which is dependent on properties of the record carrier.

20. A method of recording a series of marks representing data in an information layer of a record carrier using a radiation beam, comprising:

writing a first mark and a next mark in the series of marks, each mark being produced by irradiating the information layer with a sequence of pulses at a write power level and irradiating between the pulses at a first power level, the first power level being lower than the write power level; and irradiating the information layer with a plurality of power levels after the sequence for the first mark and before the sequence for the next mark, including:

irradiating with a second power level after the last pulse of the first mark writing sequence, irradiating with one or more intermediate power levels after irradiating with the second power level, the intermediate power levels being higher than the second power level; and irradiating with a third power level after irradiating with the intermediate power levels, the third power level being higher than the intermediate power levels and different than the write power level.

21. The method of claim 20 in which the second power level is lower than the write power level.

22. The method of claim 21 in which the third power level is lower than the write power level.

23. The method of claim 20 in which the third power level is an erase level capable of erasing previously written marks to produce an unmarked region separating the marks.

24. The method of claim 23 in which the second power level is lower than the write power level.

25. The recorder of claim 23 in which the third power level is an erase level capable of erasing previously written marks to produce an unmarked region separating the marks.

26. An optical recorder for recoding marks representing data on an information layer of a record carrier using a radiation beam, the device comprising:

a radiation source providing the radiation beam; and control means to control the power of the radiation beam for:

writing a first mark and a next mark in the series of marks, each mark being produced by irradiating the information layer with a sequence of pulses at a write power level and irradiating between the pulses at a first power level, the first power level being lower than the write power level; and irradiating the information layer with a plurality of power levels after the sequence for the first mark and before the sequence for the next mark, including:

irradiating with a second power level after the last pulse of the first mark writing sequence, irradiating with one or more intermediate power levels after irradiating with the second power level, the intermediate power levels being higher than the second power level; and irradiating with a third power level after irradiating with the intermediate power levels, the third power level being higher than the intermediate power levels and different than the write power level.

27. The recorder of claim 26 in which the third power level is lower than the write power level.

* * * * *